United States Patent [19]
Lehmann et al.

[11] Patent Number: 5,949,333
[45] Date of Patent: Sep. 7, 1999

[54] OPERATION SENSITIVE REMINDER

[76] Inventors: Roger W. Lehmann, 808 Ashley Ave., Brielle, N.J. 08730; Michael I. Satten, 26 Cow La., Kings Point, N.Y. 11024

[21] Appl. No.: 09/025,101

[22] Filed: Feb. 17, 1998

Related U.S. Application Data

[63] Continuation-in-part of application No. 08/855,562, May 13, 1997, Pat. No. 5,801,629, which is a continuation-in-part of application No. 08/801,447, Feb. 18, 1997, Pat. No. 5,777,554, which is a continuation-in-part of application No. 08/764,823, Dec. 12, 1996, Pat. No. 5,721,532.

[51] Int. Cl.$^6$ ...................................................... G08B 13/14
[52] U.S. Cl. ................. 340/571; 340/568.1; 340/309.15; 340/527; 340/523; 340/540; 340/528; 340/457; 340/635; 340/679
[58] Field of Search ...................................... 340/571, 568, 340/309.15, 527, 523, 540, 528, 457, 635, 679

[56] References Cited

U.S. PATENT DOCUMENTS

| | | | |
|---|---|---|---|
| 3,436,726 | 4/1969 | Dentz | 340/457 |
| 3,870,818 | 3/1975 | Barton et al. | 704/258 |
| 4,016,538 | 4/1977 | Miller | 340/457 |
| 4,051,397 | 9/1977 | Taylor | 310/329 |
| 4,229,663 | 10/1980 | Sibley | 307/9.1 |
| 4,291,301 | 9/1981 | Chan | 340/568.1 |
| 4,412,205 | 10/1983 | Von Kemenczky | 340/331 |
| 4,524,243 | 6/1985 | Shapiro | 179/38 |
| 4,558,307 | 12/1985 | Lienart van Lidt de Jeude | 340/527 |
| 4,764,111 | 8/1988 | Knierim | 433/5 |
| 4,872,278 | 10/1989 | Ross et al. | 40/424 |
| 4,884,067 | 11/1989 | Nordholm et al. | 340/689 |
| 4,933,852 | 6/1990 | Lemelson | 701/30 |
| 4,972,177 | 11/1990 | Nolan | 340/573.7 |
| 4,980,667 | 12/1990 | Ames | 340/427 |
| 5,043,705 | 8/1991 | Rooz et al. | 340/573.1 |
| 5,045,839 | 9/1991 | Ellis et al. | 340/539 |
| 5,172,094 | 12/1992 | Stadler | 340/426 |
| 5,276,427 | 1/1994 | Peterson | 340/522 |
| 5,294,914 | 3/1994 | Dallas | 340/432 |
| 5,315,289 | 5/1994 | Fuller et al. | 340/532 |
| 5,316,515 | 5/1994 | Hyman et al. | 446/28 |
| 5,640,145 | 6/1997 | Newham | 340/573.1 |

*Primary Examiner*—Benjamin C. Lee
*Attorney, Agent, or Firm*—Caesar, Rivise, Bernstein, Cohen & Pokotilow, Ltd.

[57] ABSTRACT

A compact operation sensitive reminder device that is readily attachable to almost any movable item and that emits an alert signal (e.g., audio, visible or tactile) when the item is initially changed from an non-operative condition to an operative condition and then remains silent during the item's operation, and emits the alert signal again only after a certain amount of time that the item has remained non-operative.

45 Claims, 5 Drawing Sheets

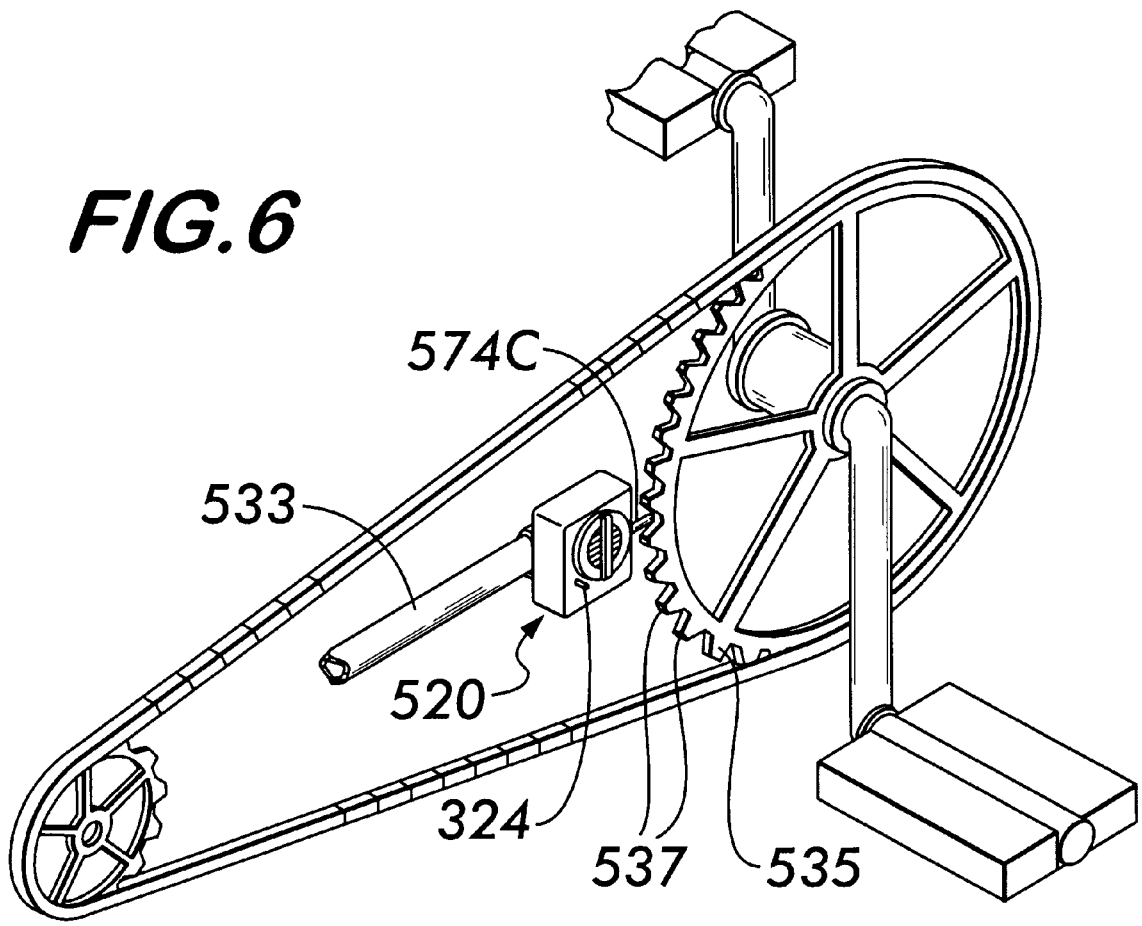

OPERATION SENSITIVE REMINDER

RELATED APPLICATIONS

This application is a Continuation-in-Part of application Ser. No. 08/855,562 filed May 13, 1997 entitled MOTION SENSITIVE REMINDER, now U.S. Pat. No. 5,801,629, which is a Continuation-In-Part of application Ser. No. 08/801,447 filed Feb. 18, 1997 entitled MOTION SENSITIVE REMINDER, now U.S. Pat. No. 5,777,554 which is a Continuation-in-Part of application Ser. No. 08/764,823 filed Dec. 12, 1996, entitled MOTION SENSITIVE REMINDER, now U.S. Pat. No. 5,721,532, all of whose disclosures are incorporated by reference herein.

FIELD OF THE INVENTION

The invention relates generally to automatic advisory devices and more specifically to automatic audible, visual and tactile devices that are attachable to items, or form an integral portion of such items, that can be moved (such as apparel, sports equipment, luggage, or any movable components on a stationary device, etc.,) or other items that can be powered on or off (machinery such as drills, power saws, etc.) for reminding the user to take appropriate action upon initial movement or operation of the item.

BACKGROUND OF THE INVENTION

The following U.S. Patents disclose motion detection alerting devices, such as those used on vehicles, bicycles and children's toys.

U.S. Pat. No. 4,980,667 (Ames) discloses a bicycle alarm device for audibly warning the bicycle owner that his/her bicycle is being moved impermissibly.

U.S. Pat. No. 5,294,914 (Dallas) discloses a bicycle helmet warning system to alert the seated rider that the helmet stowed in a helmet holder of the bicycle is not being worn.

U.S. Pat. No. 4,016,538 (Miller) discloses a safety device for a motorcycle which includes a device that actuates the horn of a motorcycle if the side stand is down, the ignition is on, and the motorcycle is in the driving position.

U.S. Pat. No. 5,316,515 (Hyman et al.) discloses a child's toy that is worn by the child and includes, among other things, a motion switch for detecting movements of the toy and for generating sounds responsive to the movements.

U.S. Pat. No. 4,051,397 (Taylor) discloses a two-sensitivity level kinetic sensor that activates an alarm circuit whenever the surface, upon which the sensor is disposed, is moved.

U.S. Pat. No. 4,229,663 (Sibley) discloses a device for sensing vehicular mechanical motion.

U.S. Pat. No. 4,412,205 (Von Kemenczky) discloses a switch device for use on an illuminated article worn by a user that illuminates when certain motions are made by the wearer.

U.S. Pat. No. 5,315,289 (Fuller et al.) discloses an interactive protective system that includes a protective garment worn by the operator and includes sensors which detect respective conditions for alerting the operator about nearby dangers.

U.S. Pat. Nos. 3,870,818 (Barton et al.) and 4,933,852 (Lemelson) disclose apparatus for indicating operational characteristics of a machine, such as a motor vehicle, that utilizes among other things synthetic speech to advise the operator of appropriate action to be taken.

U.S. Pat. No. 3,436,726 (Dentz) discloses a hood actuated warning device for motor vehicles that warns the operator in the event that the hood of the vehicle is not fully closed at such times when the vehicle is being operated.

However, there remains a need for a compact device that is readily attachable to almost any movable item, or that is integrally formed with almost any movable item, that provides an alert signal (e.g., an advisory statement, a visual indication, or a tactile indication) to the person who initially moves or operates the item and then remains silent during the item's use, and emits the alert signal again only after a certain amount of time that the item remains stationary or non-operative.

OBJECTS OF THE INVENTION

Accordingly, it is the general object of this invention to provide an apparatus which improves upon and overcomes the disadvantages of the prior art.

It is another object of this invention to provide an operation sensitive reminder device that is small in size.

It is still another object of this invention to provide an operation sensitive reminder device that is attachable to any movable item.

It is still yet another object of this invention to provide an operation sensitive reminder device that minimizes power consumption.

It is even a further object of this invention to provide an operation sensitive reminder device that can emit an audio signal, such as an audible instruction, a sound, or music without becoming a nuisance.

It is even yet a further object of this invention to provide an operation sensitive reminder that can emit a visual indication without becoming a nuisance.

It is still yet another object of this invention to provide an operation sensitive reminder that can emit a tactile indication without becoming a nuisance.

It still yet another object of this invention to provide an operation sensitive reminder that forms an integral portion of any operable item.

It is still yet a further object of this invention to provide an operation sensitive reminder device that automatically resets itself under predetermined conditions.

It is still yet another object of this invention to provide an operation sensitive reminder device that indicates to the user when power is low.

SUMMARY OF THE INVENTION

These and other objects of the instant invention are achieved by providing an apparatus for providing an alert signal (e.g., at least one audible statement, music, beeping or any other type of sound, a visual indication such as a flashing light, a tactile signal such as a vibrating motion, etc.) each time an item that is operable is changed from an non-operative state (e.g., a stationary condition or a power-off condition) to an operative state (e.g., a mobile condition or a power-on condition). The apparatus comprises a housing and means for releasably coupling the housing to the item. The housing comprises a transducer (e.g., a speaker, a light emitting diode, a vibrating device, etc.) for emitting the alert signal, a sensor that generates a signal representative of operation of the item (e.g., a motion sensor, a contact sensor, a rotation sensor, a compression/weight sensor, a displacement sensor, etc.), and control means coupled to the transducer and to the sensor for controlling the transducer emission. The control means activates the transducer each time the control means receives the sensor signal following a predetermined period of time that the item has remained non-operative.

These and other objects of the instant invention are also achieved by providing an apparatus for providing an alert signal (e.g., at least one audible statement, music, beeping or any other type of sound, a visual indication such as a flashing light, a tactile signal such as a vibrating motion, etc.) each time an item that is operable is changed from an non-operative state (e.g., a stationary condition or a power-off condition) to an operative state (e.g., a mobile condition or a power-on condition). The apparatus comprises a housing that forms an integral portion of the item. The housing comprises a transducer (e.g., a speaker, a light emitting diode, a vibrating device, etc.) for emitting the alert signal, a sensor that generates a signal representative of operation of the item (e.g., a motion sensor, a contact sensor, a rotation sensor, a compression/weight sensor, a displacement sensor, etc.), and control means coupled to the transducer and to the sensor for controlling the transducer emission. The control means activates the transducer each time the control means receives the sensor signal following a predetermined period of time that the item has remained non-operative.

These and other objects of the instant invention are also achieved by providing a method for providing an alert signal each time an item that is operable is changed from an non-operative state to an operative state. The method comprises the steps of (a) coupling a transducer to the item whereby the transducer emits an alert signal when activated by a control means coupled thereto; (b) detecting the change from the non-operative state to the operative state of the item using a sensor, coupled to the item and the control means, that generates a signal representative of the changed state of the item; and (c) activating the transducer by the control means each time the item has changed from an non-operative state to an operative state following a predetermined period of time that the item has remained in the non-operative state.

DESCRIPTION OF THE DRAWINGS

Other objects and many of the attendant advantages of this invention will be readily appreciated as the same becomes better understood by reference to the following detailed description when considered in connection with the accompanying drawings wherein:

FIG. 6 is a third embodiment of the sensor used in the operation sensitive reminder.

DETAILED DESCRIPTION OF THE PREFERRED EMBODIMENT

Figure 1:
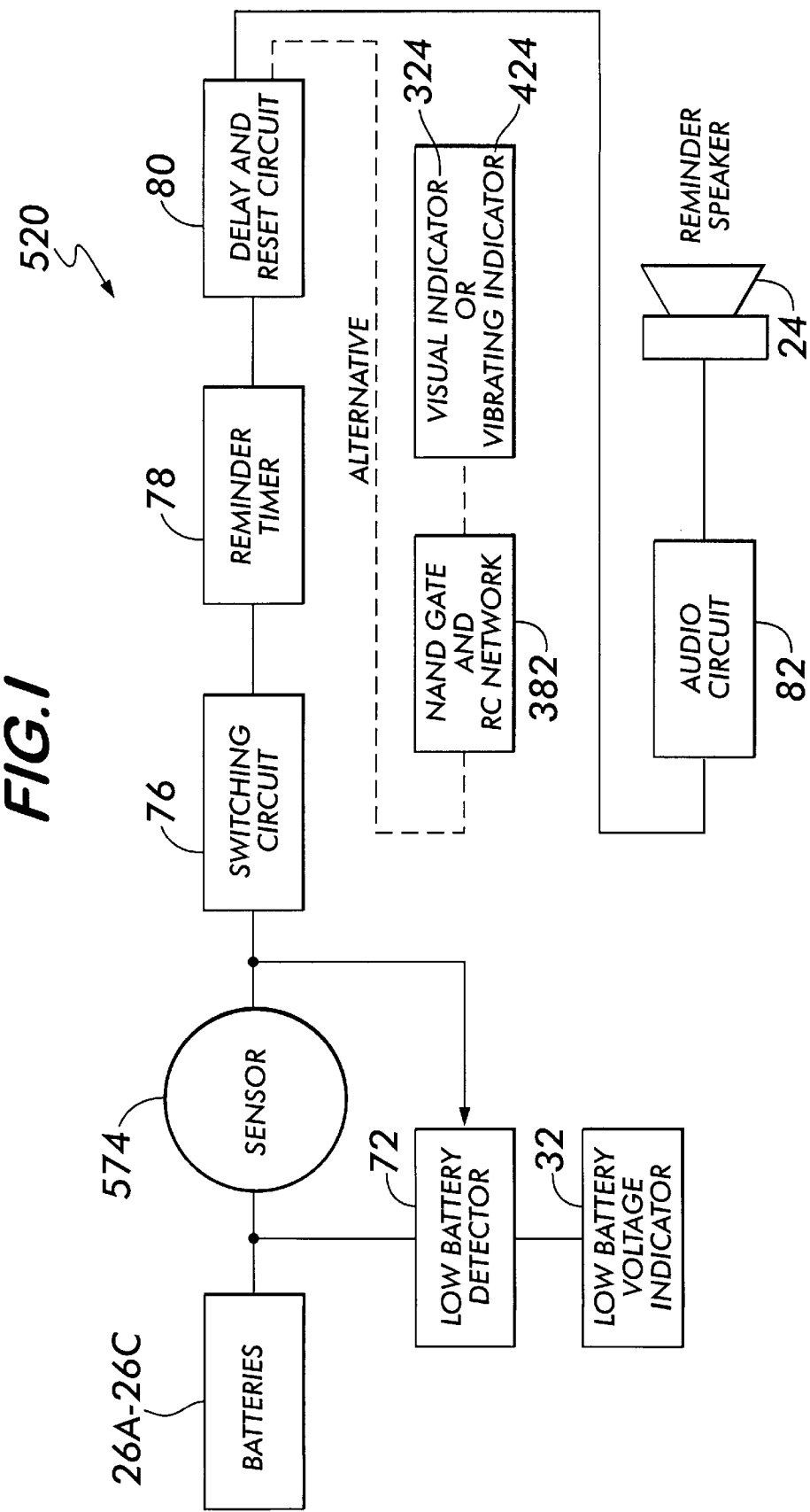
FIG. 1 is a block diagram of the electronics of the operation sensitive reminder.

Referring now in detail to the various figures of the drawing wherein like reference characters refer to like parts, there is shown at 520 in FIG. 1, an operation sensitive reminder (hereinafter "OSR"). The OSR 520 is similar to the MSR devices disclosed in application Ser. No. 08/855,562, application Ser. No. 8/801,447 and application Ser. No. 08/764,823 (all of whose disclosures are incorporated by reference herein) except that the sensor 574 utilized in the OSR 520 is not limited to a motion sensor; instead, the sensor 574 includes any sensor that generates a signal representative of the item being operated such as movement of the item, or energizing the item (e.g., a drill, saw, etc.). Thus, the following disclosure discusses a variety of sensors that can be utilized with the electronics of the MSRs of the above-mentioned patent applications.

Figure 2:
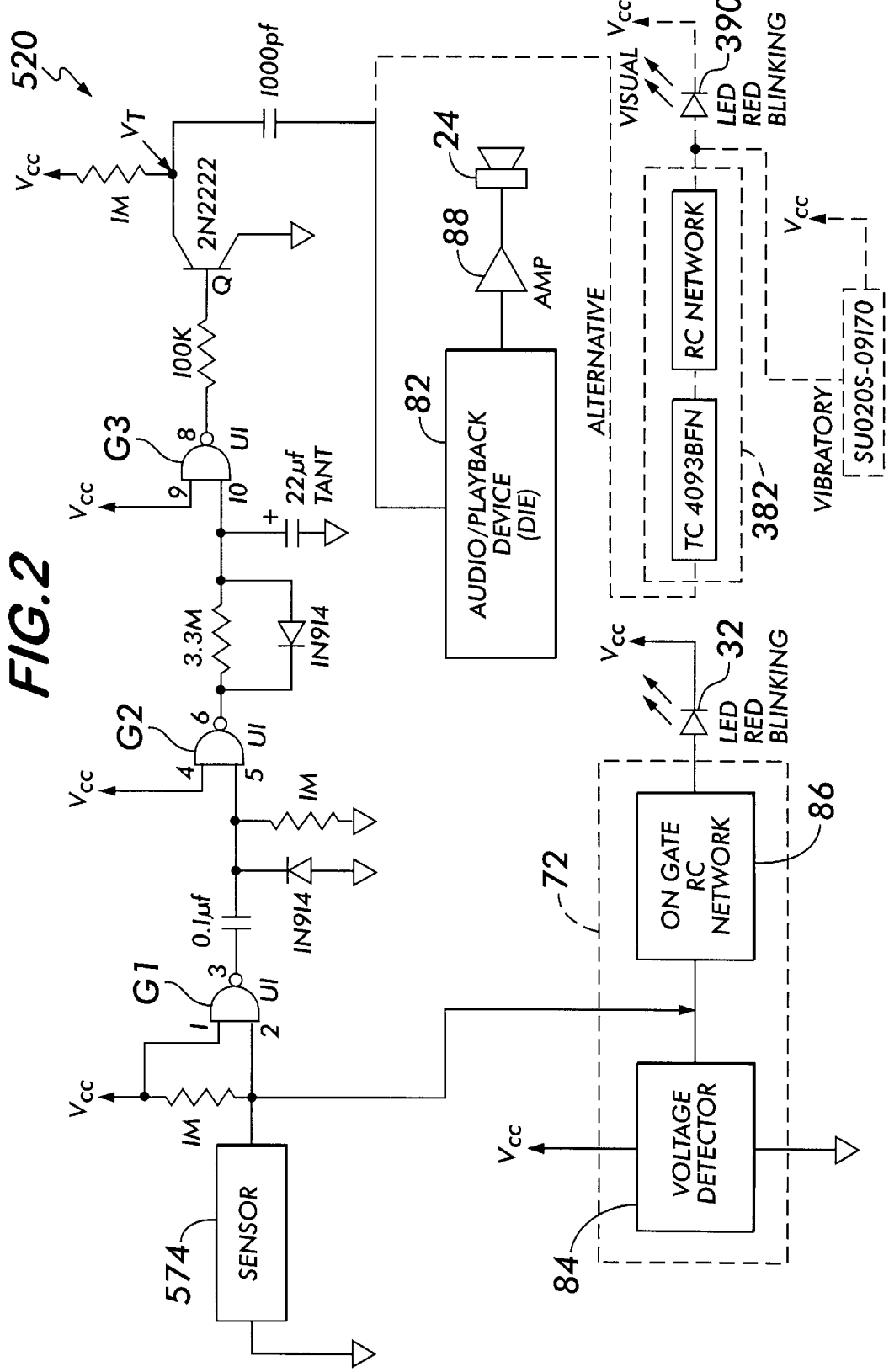
FIG. 2 is a circuit schematic of the electronics of the operation sensitive reminder.

As shown in the electrical schematic (FIG. 2) of the OSR 520, the sensor 574 provides input to G1. In particular, the sensor 574 acts to switch the input of G1 between a $V_{cc}$ and ground. As discussed in more detail in application Ser. No. 08/764,823, this switching causes the 22 $\mu$F capacitor to discharge, thereby activating either the audio path 82 or the visual/vibrational path 382 (see application Ser. No. 08/855, 562). Thus, once the item is operated (e.g., moved or energized, etc.), the sensor 574 initiates the discharge of the 22 $\mu$F capacitor and alerts the user; the audio path 82 (or the visual/vibrational path 382) then plays out for a predetermined period of time and then shuts off. As long as the item maintains its operation, the sensor 574 continues this alternating input at G1 which keeps the 22 $\mu$F capacitor discharged and the audio path 82 (or the visual/vibrational path 382) off. Once the item is left stationary, or non-operative, for a certain amount of time, the sensor 574 no longer switches the input at G1 and the 22 $\mu$F capacitor charges up, thereby resetting and awaiting the next operation of the device. Therefore, the following sensors are exemplary of such sensors that can detect the operation of the device and provide the proper alternation of the input at G1. Furthermore, as an example of the item being operated or moved, a bicycle is used. It should be understood that this is by way of example only, and not limitation, and that any other type of item that can be moved or operated can be used, such as the roller blades depicted in application Ser. No. 08/801,447, or a helmet, etc.

Figure 3:
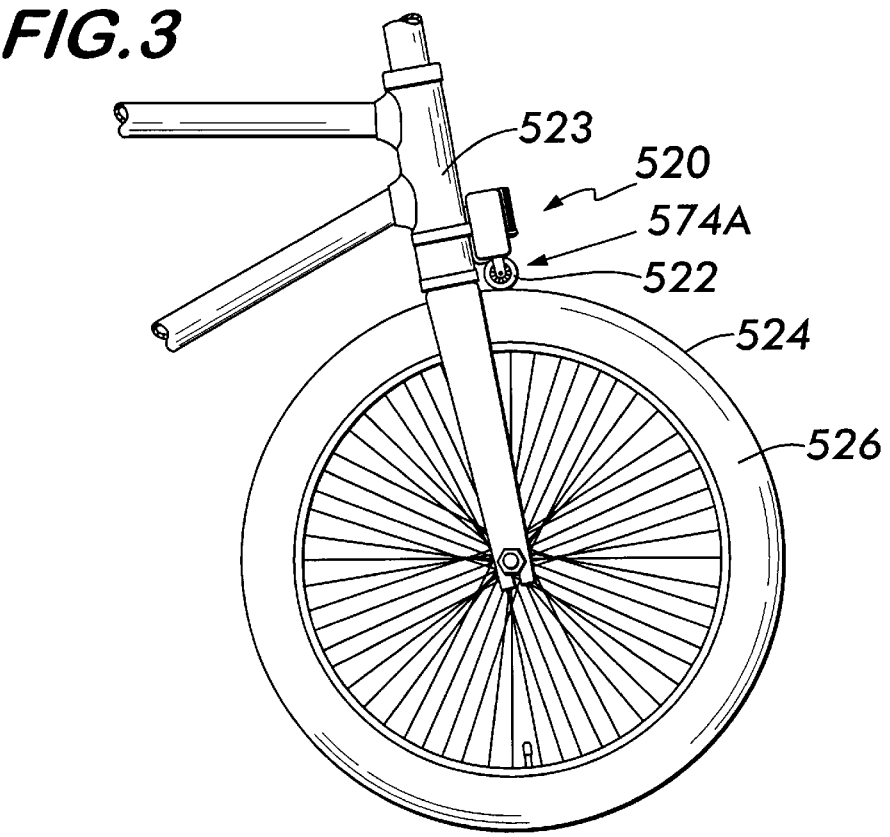
FIG. 3 is a first embodiment of the sensor used in the operation sensitive reminder.

FIG. 3 depicts a first embodiment 574A of the sensor 574 attached to a bicycle on a front wheel strut 523. In particular, a contact wheel 522 projects from the bottom of the OSR 520. This wheel 522 rides along the perimeter 524 of a bicycle tire 526. As the wheel 522 rotates, it drives a switch (not shown) internal to the OSR 520 that causes the input to G1 to alternate between ground and $V_{cc}$. Thus, in accordance with application Ser. No. 08/764,823, when the bicycle is first moved from a stationary position, the rotation sensor 574A alternates the input to G1, thereby causing the 22 $\mu$F capacitor to discharge and thereby activate either the audio path 82 or the visual path 382 for a predetermined period. Furthermore, as long as the bicycle continues to move, the sensor 574A maintains the 22 $\mu$F capacitor in a discharged state and the audio path 82, or the visual path 382, remain off. Once the bicycle is maintained in a stationary state for a certain amount of time (e.g., for approximately 10 minutes), the input to G1 no longer alternates and the 22 $\mu$F capacitor charges up and awaits another initial movement.

Figure 4:
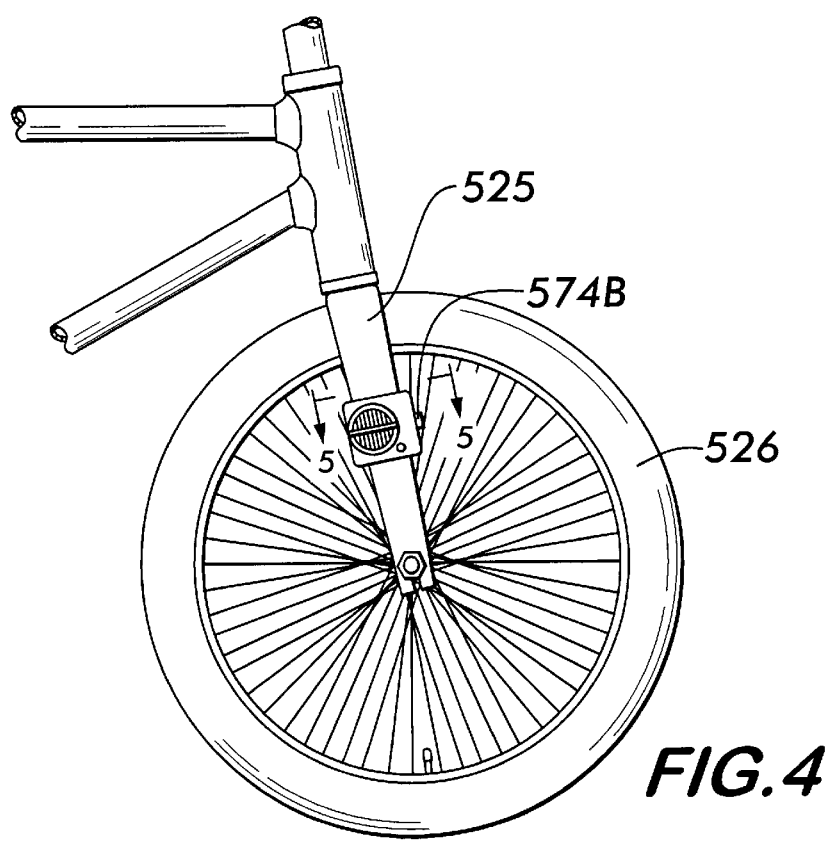
FIG. 4 is a second embodiment of the sensor used in the operation sensitive reminder.
Figure 5:
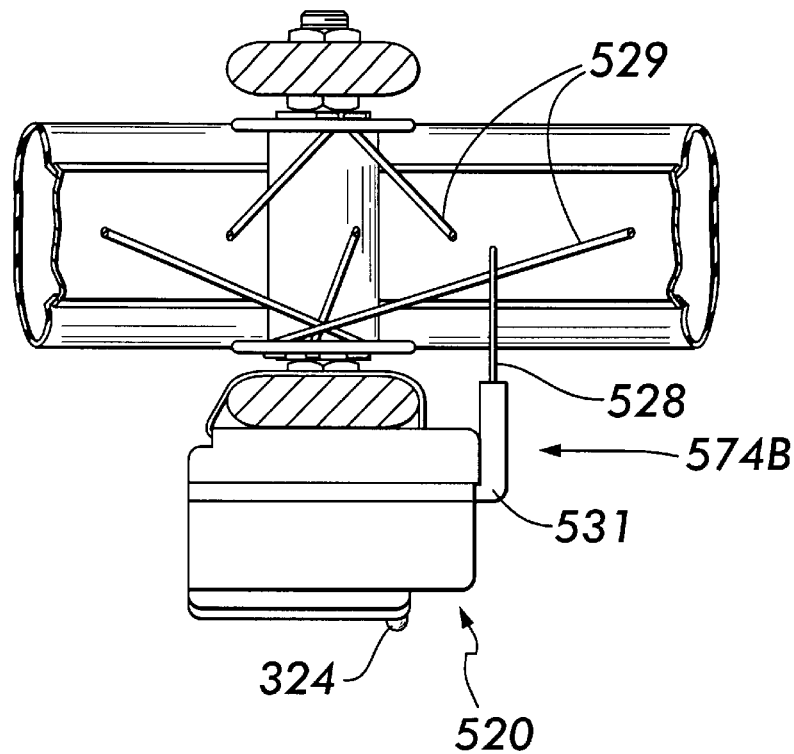
FIG. 5 is a view of the second embodiment of the sensor taken along line 5—5 of FIG. 4.

FIG. 4 depicts a second embodiment 574B of the sensor 574 also attached to a bicycle on a lower portion of a wheel fork 525. As shown most clearly in FIG. 5, a spoke contact 528 projects from the side of the OSR 520. This contact 528 projects into the plane of the bicycle spokes 529. A right-angled support 531 permits the spoke contact 528 to operate regardless if the wheel 526 is moved forward or backward. As the wheel 526 rotates, the spoke contact 528 alternately clears and contacts the spokes which drives an internal switch (not shown, discussed above with respect to the sensor 574A), thereby causing the input to G1 to alternate between ground and V. Thus, in accordance with application Ser. No. 08/764,823, when the bicycle is first moved from a stationary position, the contact sensor 574B alternates the input to G1, thereby causing the 22 $\mu$F capacitor to discharge and thereby activate either the audio path 82 or the visual path 382 for a predetermined period. Furthermore, as long as the bicycle continues to move, the sensor 574B maintains the 22 $\mu$F capacitor in a discharged state and the audio path 82 and visual path 382 remain off. Once the bicycle is maintained in a stationary state for a certain amount of time (e.g., approximately 10 minutes), the input to G1 no longer alternates and the 22 $\mu$F capacitor charges up and awaits another initial movement.

FIG. 6 depicts a third embodiment 574C of the sensor 574 attached to a bicycle at a strut 533 adjacent the bicycle sprocket 535 (e.g., the driving sprocket). In particular, a the sensor 574C comprises a cam that projects from the side of the OSR 520 and is driven by the teeth 537 of the sprocket 525. As the sprocket 525 is turned, the cam of sensor 574C is displaced in and out as the cam rides along the periphery of the teeth 537 of the sprocket 525. This alternating in and out of the cam of the displacement sensor 574C drives an internal switch (not shown, discussed above with respect to the sensor 574A), thereby causing the input to G1 to alternate. Thus, in accordance with application Ser. No. 08/764,823, when the bicycle is first moved from a stationary position, the sensor 574C alternates the input to G1, thereby causing the 22 $\mu$F capacitor to discharge and thereby activate either the audio path 82 or the visual path 382 for a predetermined period. Furthermore, as long as the bicycle operator continues to pedal the bicycle, the sensor 574C maintains the 22 $\mu$F capacitor in a discharged state and the audio path 82 and visual path 382 remain off. Once the sprocket 535 is no longer rotated by the bicycle operator for a certain amount of time (e.g., approximately 5 minutes), the input to G1 no longer alternates and the 22 $\mu$F capacitor charges up and awaits another initial movement. It should be noted that the certain amount of time, e.g., 5 minutes, can be made long enough in order to distinguish between the bicycle operator simply coasting (still an operative state) and the bicycle being unused (non-operative state). Thus, for example, a 5 minute period of time in which the input to G1 is no longer alternated would, in all probability, represent a condition where the bicycle operator has dismounted from the bicycle; whereas, non-rotation of the sprocket for approximately 1–2 minutes may represent the bicycle operator coasting down a long hill.

Figure 7:
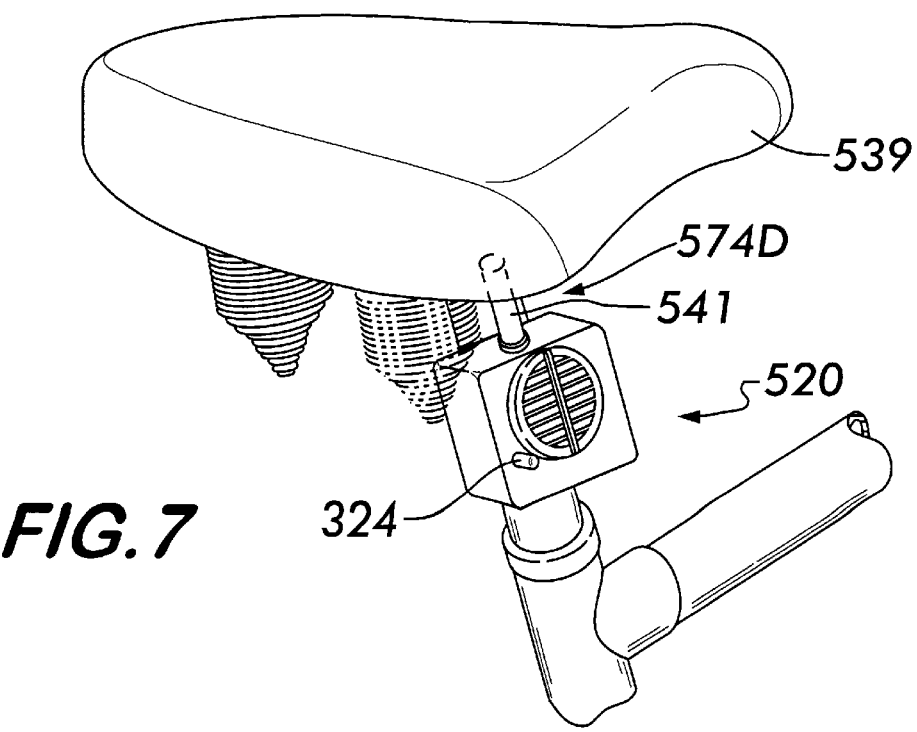
FIG. 7 is a fourth embodiment of the sensor used in the operation sensitive reminder.

FIG. 7 depicts a fourth embodiment 574D of the sensor 574 attached to a bicycle under the seat 539. In particular, a sensor member 541 projects upward from the top of the OSR 520. When the user sits on the seat 539, the sensor member 541 is driven downward into the OSR 520. This compression of the sensor member 534 by the weight of the user activates an oscillator (not shown) in the electronics of the OSR 520. This oscillator causes the input to G1 to alternate. Thus, in accordance with application Ser. No. 08/764,823, when the user first sits on the seat 539, the oscillator in the sensor 574D alternates the input to G1, thereby causing the 22 $\mu$F capacitor to discharge and thereby activate either the audio path 82 or the visual path 382 for a predetermined period. Furthermore, as long as the user continues to sit on the seat 539, the sensor 574D maintains the 22 $\mu$F capacitor in a discharged state and the audio path 82 and visual path 382 remain off. Once the user rises off of the seat for a certain amount of time (e.g., approximately 5 minutes), the oscillator remains off and the input to G1 no longer alternates and the 22 $\mu$F capacitor charges up and awaits another initial movement. As with the previous sensor embodiment, a long enough period of time (e.g., 5 minutes) can be used in order to distinguish between the bicycle operator standing while pedaling/coasting (operative state) versus where the bicycle operator has dismounted from the bicycle (non-operative state).

It is within the broadest scope of this invention that the sensor 574 also encompass the ability to detect the activation (e.g., power on) of a device. For example, instead of detecting the movement of an item, such as power drill, the sensor 574 may detect the powering of the drill and thereby activate the oscillator, as discussed above. As such, when the operator turns on the drill, the oscillator in the sensor 574 begins alternating the input to G1 and operation of the OSR 520 is as discussed previously. Thus, it is apparent that the present invention 520 is meant to detect the initial operation of almost any device from an non-operative state (stationary condition or power off condition) to an operative state (mobile condition or power on condition) and then to immediately alert the operator, by sound, sight or vibration for a predetermined period of time, to take some appropriate action; and as long as the device is maintained in that operative state, the present invention 520 remains off. Once the device is left stationary for a certain amount of time, or is made non-operative for a certain amount of time, the present invention 520 is reset, thereby awaiting the next movement or activation to alert the operator.

Also in accordance with application Ser. No. 08/764,823, one of the features of the OSR 520 is the small size of the housing 22 (e.g., approximately 1.5"×1.5") which makes it readily attachable to almost any item that is movable. Moreover, various attachment means can be used to couple the OSR 520 to these items, as disclosed in application Ser. No. 08/764,823.

In accordance with application Ser. No. 08/801,447, the OSR 520 can be integral with the item that is operated, rather than being coupable to an existing movable item.

In accordance with application Ser. No. 08/855,562, the transducer of the OSR 520 can emit a visual signal. In particular, the OSR 520 includes a portion that permits the transducer (e.g., a light emitting diode-LED) to be supported therein while being readily visible to the operator. For example, where the OSR 520 is used with an item such as a bicycle, as shown in most clearly in FIG. 5–7, the visual indicator 324 (e.g., an LED) is positioned to stand off from the surface of the OSR 520 to be in the field of view of the operator, thereby allowing the operator to see the visual indicator 324 during operation of the item. It should be understood that the particular location of the visual indicator 324 shown in FIGS. 6 and 7 is exemplary only to show how the visual indicator 324 stands off from the OSR 520. This is not to be confused with the low battery indicator 32 that has been shown in a similar location in the MSRs of the previous patent applications, namely, application Ser. No. 08/855,562; application Ser. No. 08/80,447; and application Ser. No. 08/764,823.

Also in accordance with application Ser. No. 08/855,562, use of a vibrator as the transducing element is preferable wherever the transducing element can be supported against the operator, closely adjacent the operator (e.g., in a roller blade, in a helmet, etc.). For example, as shown in FIG. 7, the OSR 520 could including a vibrator such when the OSR 520 is activated, the vibrator emits a tactile signal through the seat support and to the seat.

Without further elaboration, the foregoing will so fully illustrate our invention that others may, by applying current or future knowledge, readily adopt the same for use under various conditions of service.

We claim:

1. An apparatus for providing an alert signal each time an item that is operable is changed from a non-operative state to an operative state, said apparatus comprising:

a housing;

means for releasably coupling said housing to the item;

said housing comprising:

a transducer for emitting said alert signal;

a sensor that generates a signal representative of operation of the item; and control means coupled to said transducer and to said sensor for controlling said transducer emission, said control means activating said transducer for a certain amount of time and then deactivating said transducer each time said control means receives said sensor signal following a predetermined period of time that the item has remained non-operative.

2. The apparatus of claim 1 wherein said transducer is a speaker.

3. The apparatus of claim 1 wherein said transducer is a light emitting diode.

4. The apparatus of claim 1 wherein said transducer is a vibrator.

5. The apparatus of claim 1 wherein said control means resides on a single die.

6. The apparatus of claim 1 wherein said alert signal is a visual signal.

7. The apparatus of claim 6 wherein said control means comprises a logic and timing circuit for providing an electrical signal representative of said visual signal to said transducer.

8. The apparatus of claim 7 wherein said logic and timing circuit comprises a timer for terminating said electrical signal representative of said visual signal after said certain amount.

9. The apparatus of claim 1 wherein said alert signal is tactile signal.

10. The apparatus of claim 9 wherein said control means comprises a logic and timing circuit for providing an electrical signal representative of said tactile signal to said transducer.

11. The apparatus of claim 9 wherein said logic and timing circuit comprises a timer for terminating said electrical signal representative of said tactile signal after said certain amount.

12. The apparatus of claim 1 wherein said alert signal is an audible signal.

13. The apparatus of claim 12 wherein said audible signal is a verbal statement.

14. The apparatus of claim 12 wherein said audible signal comprises music.

15. The apparatus of claim 12 wherein said control means comprises an audio circuit for providing an electrical signal representative of said audible signal to said transducer.

16. The apparatus of claim 15 wherein said audio circuit comprises a timer for terminating said electrical signal representative of said audible signal after said certain amount.

17. The apparatus of claim 1 wherein said control means comprises reset means for resetting said control means to prepare to activate said transducer each time the item has remained non-operative for said predetermined period of time or greater.

18. An apparatus for providing an alert signal each time an item that is operable is changed from a non-operative state to an operative state, said apparatus comprising:

a housing being formed as an integral portion of the item, said housing comprising:

a transducer for emitting said alert signal;

a sensor that generates a signal representative of operation of the item; and control means coupled to said transducer and to said sensor for controlling said transducer emission, said control means activating said transducer for a certain amount of time and then deactivating said transducer each time said control means receives said sensor signal following a predetermined period of time that the item has remained non-operative.

19. The apparatus of claim 18 wherein said control means comprises reset means for resetting said control means to prepare to activate said transducer each time the item has remained non-operative for said predetermined period of time or greater.

20. The apparatus of claim 18 wherein said transducer is a light emitting diode.

21. The apparatus of claim 18 wherein said transducer is a vibrator.

22. The apparatus of claim 18 wherein said control means resides on a single die.

23. The apparatus of claim 18 wherein said alert signal is a visual signal.

24. The apparatus of claim 23 wherein said control means comprises a logic and timing circuit for providing an electrical signal representative of said visual signal to said transducer.

25. The apparatus of claim 24 wherein said logic and timing circuit comprises a timer for terminating said electrical signal representative of said visual signal after said certain amount.

26. The apparatus of claim 18 wherein said alert signal is tactile signal.

27. The apparatus of claim 26 wherein said control means comprises a logic and timing circuit for providing an electrical signal representative of said tactile signal to said transducer.

28. The apparatus of claim 27 wherein said logic and timing circuit comprises a timer for terminating said electrical signal representative of said tactile signal after said certain amount.

29. The apparatus of claim 18 wherein said alert signal is an audible signal.

30. The apparatus of claim 29 wherein said audible signal is a verbal statement.

31. The apparatus of claim 29 wherein said audible signal comprises music.

32. The apparatus of claim 29 wherein said transducer is a speaker.

33. The apparatus of claim 29 wherein said control means comprises an audio circuit for providing an electrical signal representative of said audible signal to said transducer.

34. The apparatus of claim 33 wherein said audio circuit comprises a timer for terminating said electrical signal representative of said audible signal after said certain amount.

35. A method for providing an alert signal each time an item that is operable is changed from a non-operative state to an operative state, said method comprising the steps of:

coupling a transducer to the item, said transducer emitting an alert signal when activated by a control means coupled thereto;

detecting the change from the non-operative state to the operative state of the item using a sensor, coupled to the item and to said control means, that generates a signal representative of the changed state of the item; and activating said transducer by said control means for a certain amount of time and then deactivating said transducer each time the item has changed from a non-operative state to an operative state following a predetermined period of time that the item has remained in the non-operative state.

36. The method of claim 35 wherein said step of activating said transducer includes resetting said control means to prepare to activate said transducer each time the item has remained non-operative for said predetermined period of time or greater.

37. The method of claim 35 wherein said step of said control means activating said transducer includes activating said transducer for said certain amount of time.

38. The method of claim 35 wherein said signal representative of the changed state of the item comprises an alternating signal.

39. The method of claim 35 wherein said alert signal a verbal statement.

40. The method of claim 35 wherein said alert signal comprises music.

41. The method of claim 35 wherein said transducer is a speaker.

42. The method of claim 35 wherein said alert signal is a visual indication.

43. The method of claim 35 wherein said transducer is a light emitting diode.

44. The method of claim 35 wherein said alert signal is a tactile signal.

45. The method of claim 35 wherein said transducer is a vibrator.

* * * * *